Figure 1:
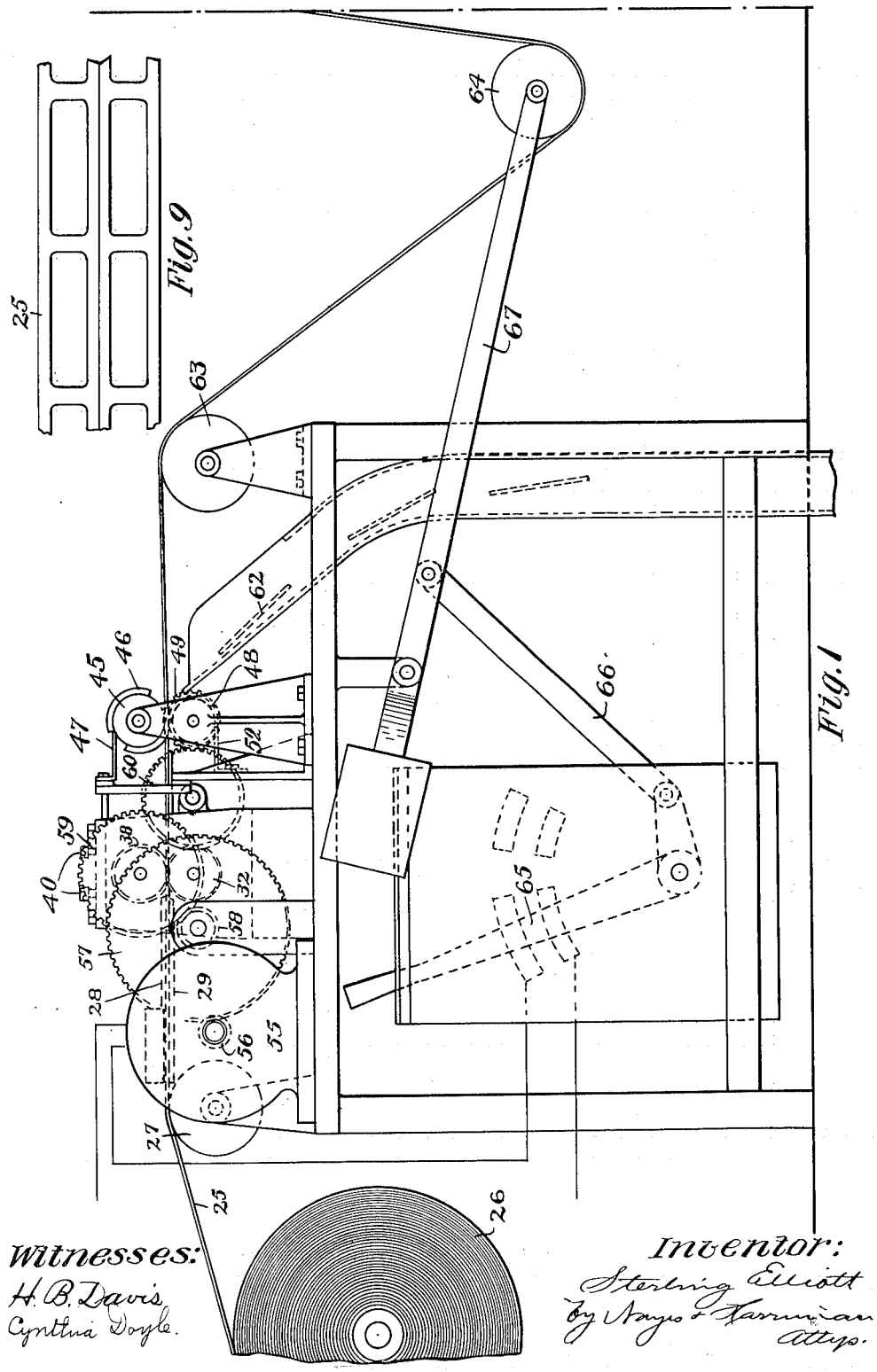

S. ELLIOTT.
MACHINE FOR MAKING STENCIL STRIPS.
APPLICATION FILED MAY 11, 1912.

1,121,080.

Patented Dec. 15, 1914.
8 SHEETS—SHEET 1.

S. ELLIOTT.
MACHINE FOR MAKING STENCIL STRIPS.
APPLICATION FILED MAY 11, 1912.

1,121,080.

Patented Dec. 15, 1914.
8 SHEETS—SHEET 3.

Witnesses:
H. B. Davis.
Cynthia Doyle.

Inventor:
Sterling Elliott
by Noyes & Harriman
Attys.

S. ELLIOTT.
MACHINE FOR MAKING STENCIL STRIPS.
APPLICATION FILED MAY 11, 1912.
1,121,080.
Patented Dec. 15, 1914.
8 SHEETS—SHEET 4.
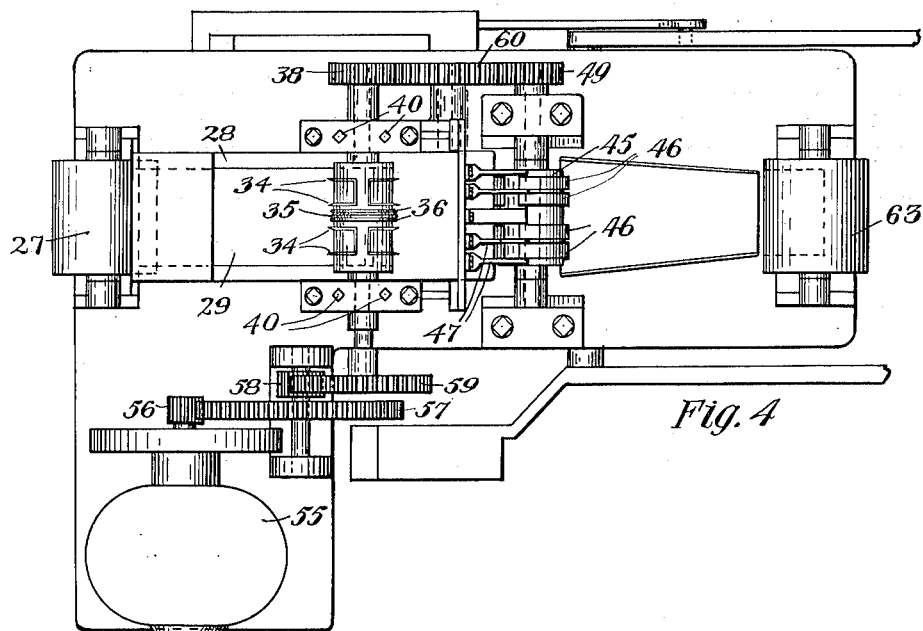
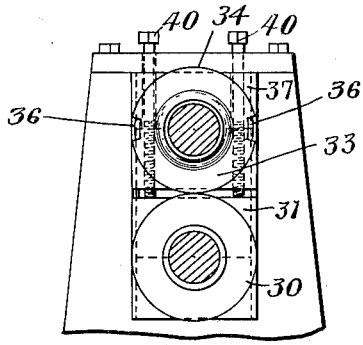
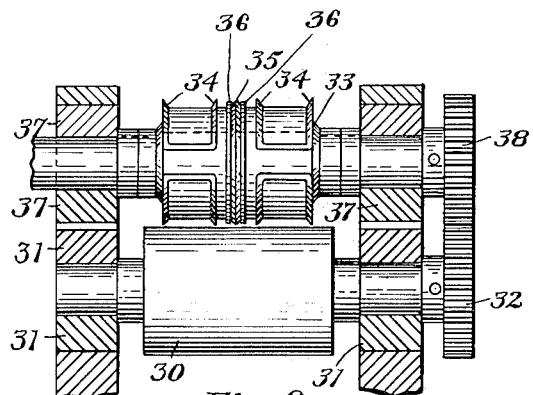
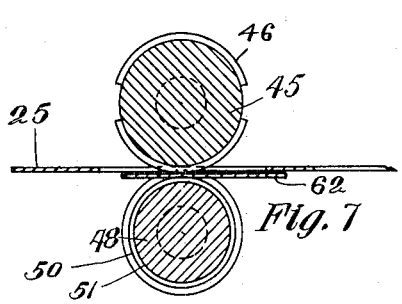
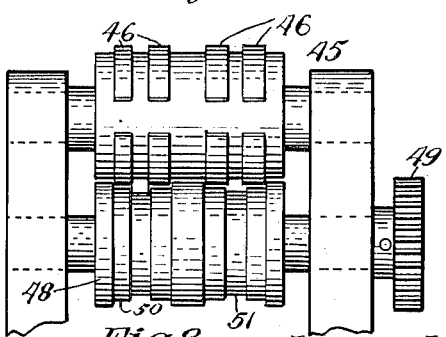
Witnesses:
H. B. Davis.
Cynthia Doyle.
Inventor:
Sterling Elliott.
by Angus Harriman
attys.

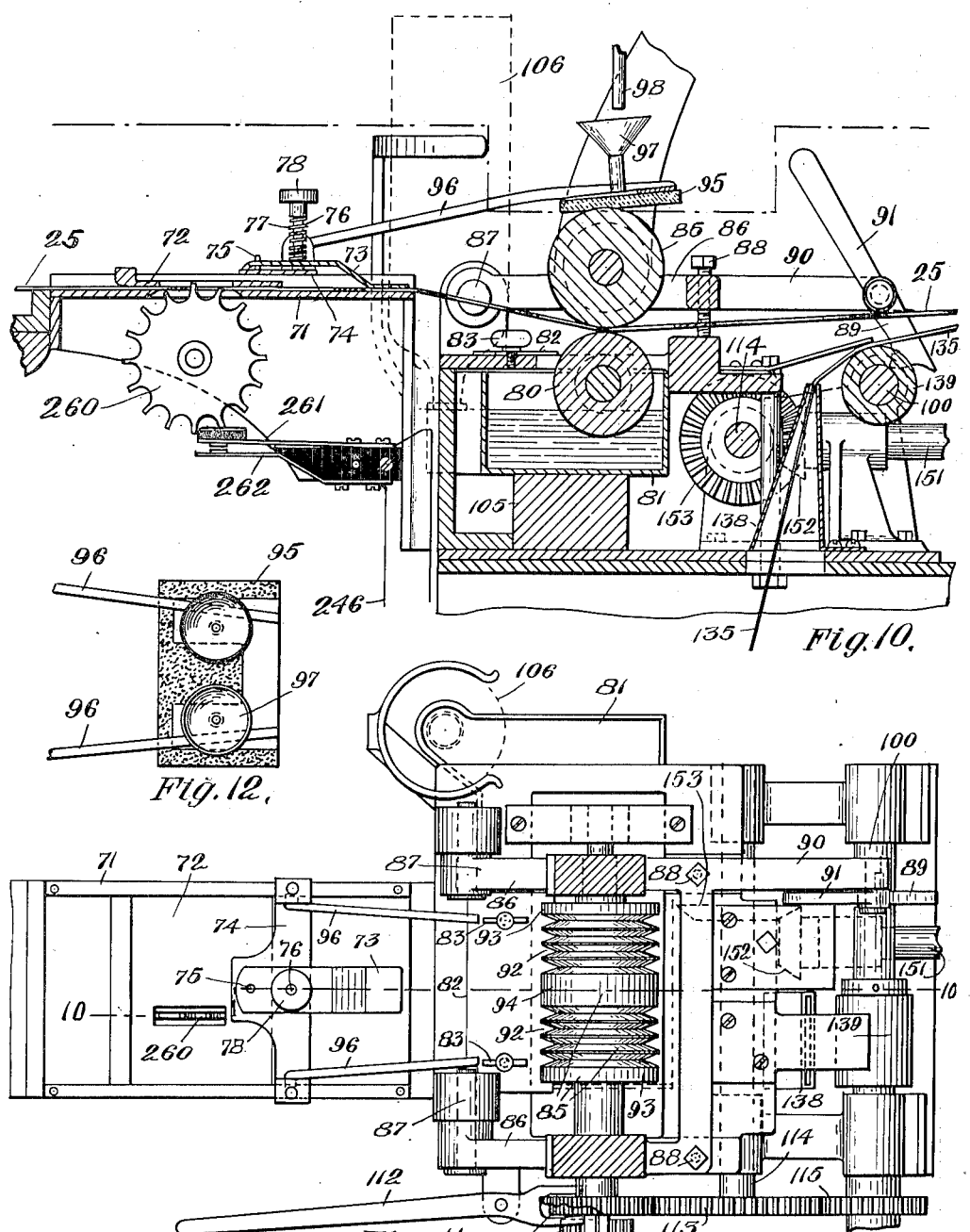

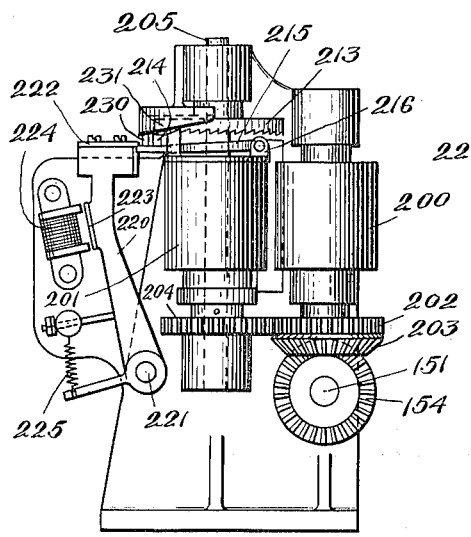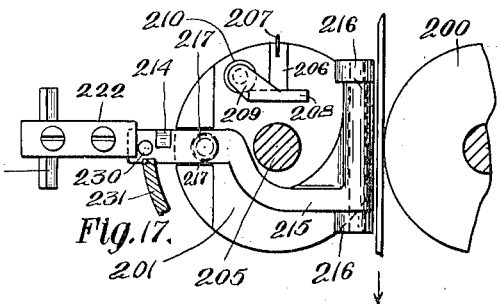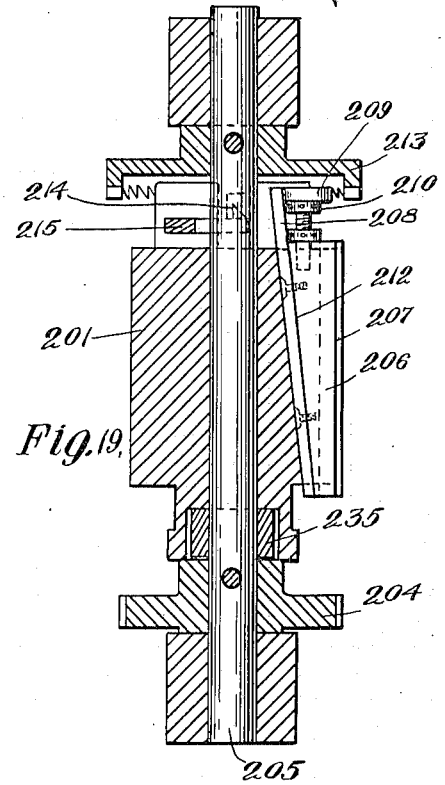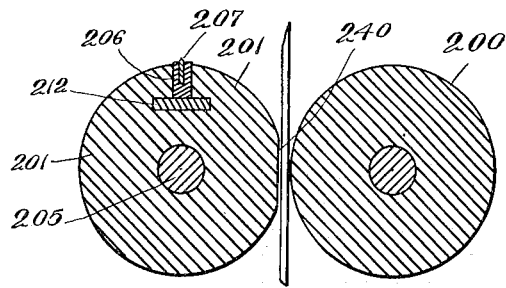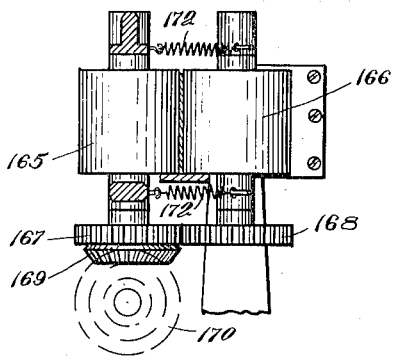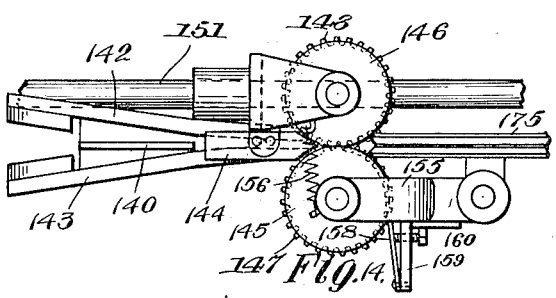

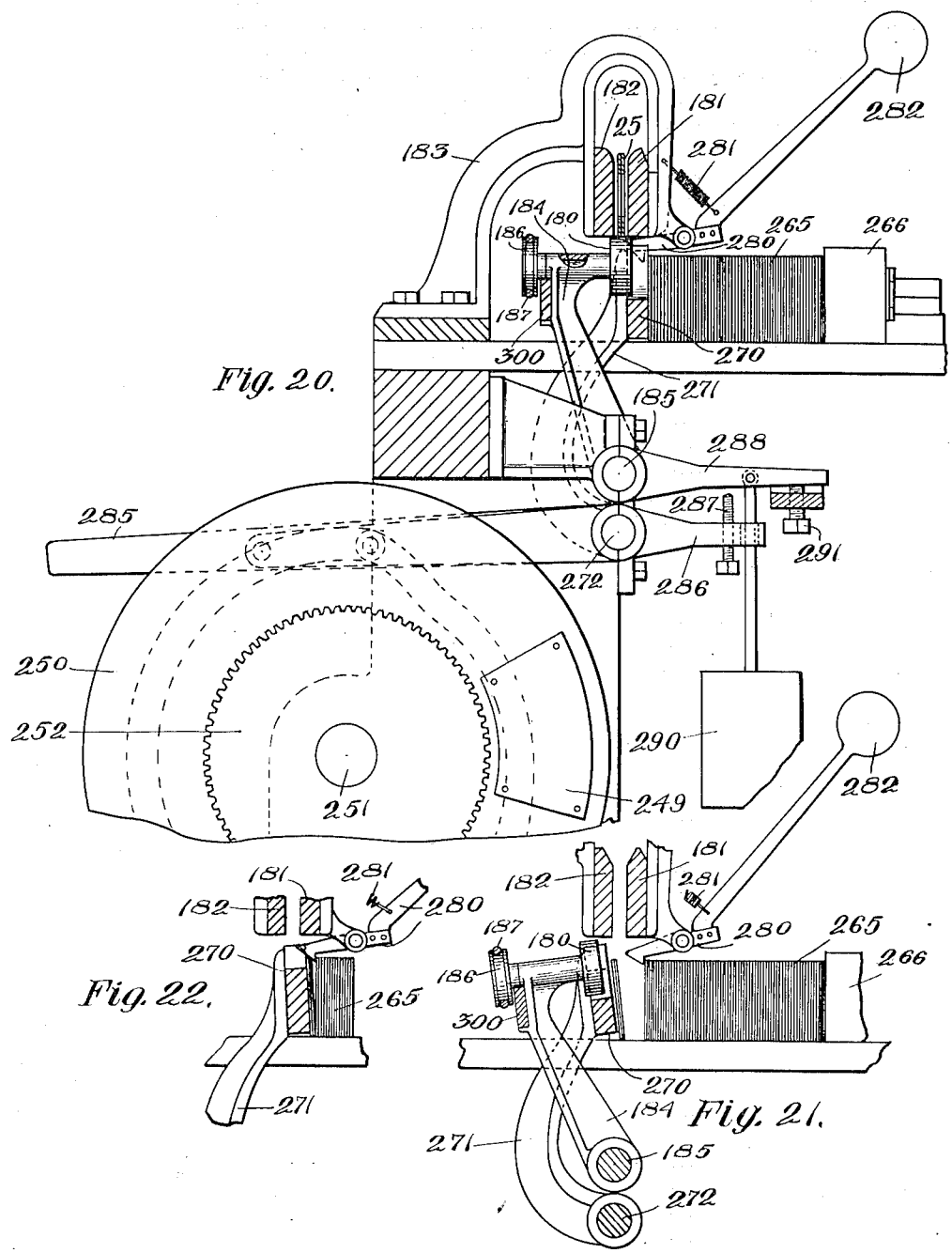

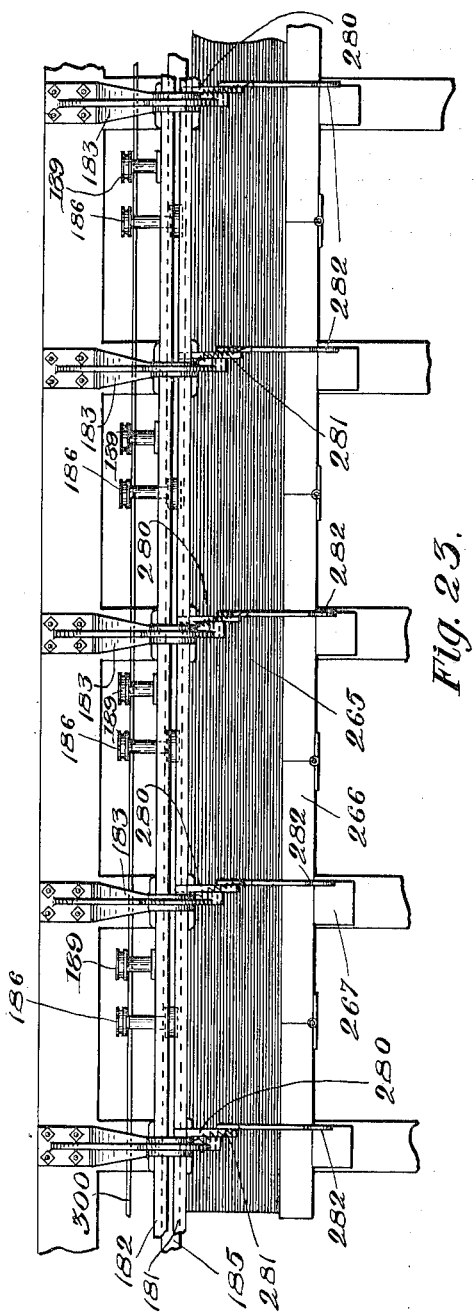
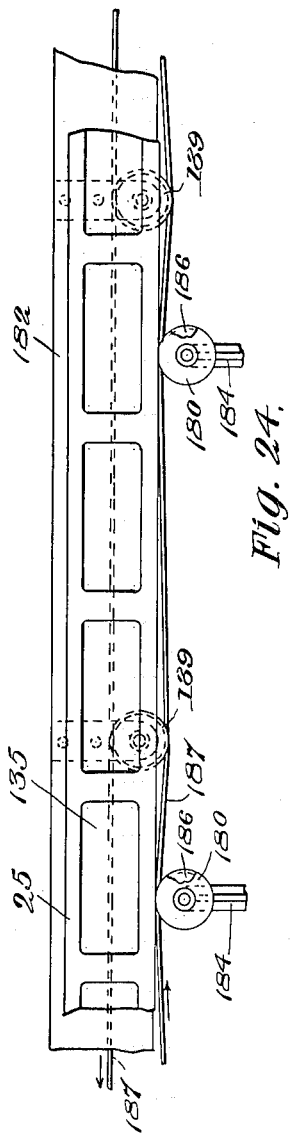

UNITED STATES PATENT OFFICE.

STERLING ELLIOTT, OF NEWTON, MASSACHUSETTS.

MACHINE FOR MAKING STENCIL-STRIPS.

1,121,080.  Specification of Letters Patent.  Patented Dec. 15, 1914.

Application filed May 11, 1912. Serial No. 696,606.

*To all whom it may concern:*

Be it known that I, STERLING ELLIOTT, a citizen of the United States, residing at Newton, in the county of Middlesex and State of Massachusetts, have invented an Improvement in Machines for Making Stencil-Strips, of which the following is a specification.

In Letters Patent #1,034,600, dated August 6, 1912, granted to me, a stencil-strip is shown composed of paper from which paper stencils are cut. Said stencil-strip is composed of a strip of paper, herein termed the "blank-strip," placed between the folds of another strip of paper, herein termed the "frame-strip," said strips being adhesively secured together. The frame-strip has holes cut in it, arranged in pairs, side by side, so that the holes of each pair register with each other when the strip is folded, and said folded strip is scored lengthwise between the holes of the successive pairs to define the line of fold and to cause the portions of the strip when folded to lie flat upon the blank-strip.

This invention relates to a machine adapted to produce such a stencil-strip, being automatic in operation; and involves many combinations of elements which are especially designed to perform the work intended for them.

The automatic machine here shown, for the purpose of illustrating my invention, comprises mechanism constructed and arranged to feed forward a strip of paper to form the frame-strip, and to cut holes in said strip, which holes are arranged in pairs, side by side, and at regular distances apart, and to score said strip continuously between the holes of successive pairs to enable the strip to be folded, whereupon the holes of each pair register with each other, thereby to form the frame-strip, said mechanism being of a rotary character and adapted to feed forward the strip of paper and cut holes therein by a continuous rotary motion of its parts. Automatic stopping and starting means are preferably provided for said frame-strip feeding and cutting-mechanism which is controlled by the strip which is delivered therefrom, so that the length of strip which is cut and delivered may be regulated. Such form of mechanism is especially well adapted for this work, for the reason that it is very rapid in operation, but my invention is not limited to the employment of this particular form of mechanism for forming the frame-strip.

Said automatic machine also comprises a gluing-mechanism adapted to apply adhesive material to the frame-strip, as for instance, to the under side thereof, and said gluing-mechanism is also adapted to feed the frame-strip forward while the glue is being applied. The gluing-mechanism here shown comprises essentially a pair of rolls, the under-roll serving as the applying-roll for the glue, it being arranged to rotate in a receptacle containing glue, and the upper-roll coöperating with said under-roll to feed the frame-strip forward while the glue is being applied. Said upper-roll and under or glue-roll are so arranged relative to each other as to deflect the frame-strip from a horizontal plane, thus to admit of said upper-roll being movably supported in order that it may be lifted a suitable distance above the glue-roll to enable the deflected frame-strip to assume a horizontal position, and thus become disengaged from the glue-roll. The glue-roll may then rotate without applying glue to the frame-strip, and also without feeding the frame-strip forward. Means are provided to hold the upper-roll in its elevated position, which is adapted to be operated automatically by a moving part of the machine, to cause it to return to normal position when the machine is started, so that the frame-strip is moved into engagement with the glue-roll, and held while the machine is running, and at other times may be disengaged therefrom.

The upper-roll is recessed opposite the holes in the frame-strip, in order that the glue, which is carried upward by the glue-roll, will not be applied to the surface of said upper-roll at such portions thereof, and means are also provided to clean the surface of said upper-roll, to remove therefrom any glue which may be deposited thereon by the glue-roll, while the latter is operating to apply the glue to the frame-strip, thus to enable said upper roll to be kept clean. The glue-roll has two separate driving-means adapted to be connected with it, one arranged to rotate said roll and also the upper-roll while applying glue to the frame-strip, and the other arranged to rotate said roll independently of said upper-roll when the frame-strip is disengaged from it, thus providing for continuously rotating said glue-roll to prevent the drying of the glue thereon, which would act to impede the operation of the machine.

Said machine also comprises means to deliver a blank-strip into proximity to the frame-strip, and means to fold the frame-strip over upon said blank-strip, so that its two side portions will engage, respectively, the opposite sides of said blank-strip, and become adhesively secured thereto. A pair of rolls are or may be employed to feed forward and compress the strips and thus insure them being adhesively secured together.

Said machine also comprises automatic means to repeatedly feed forward the stencil-strip a predetermined distance and sever it, and a table on which the severed portions are arranged, said portions being extended lengthwise the table and contiguously disposed, and means to control the assembling of the severed portions and to hold them under sufficient pressure to keep them straight and flat while drying, after which they are removed from the table and the stencils cut from them.

Figure 2:
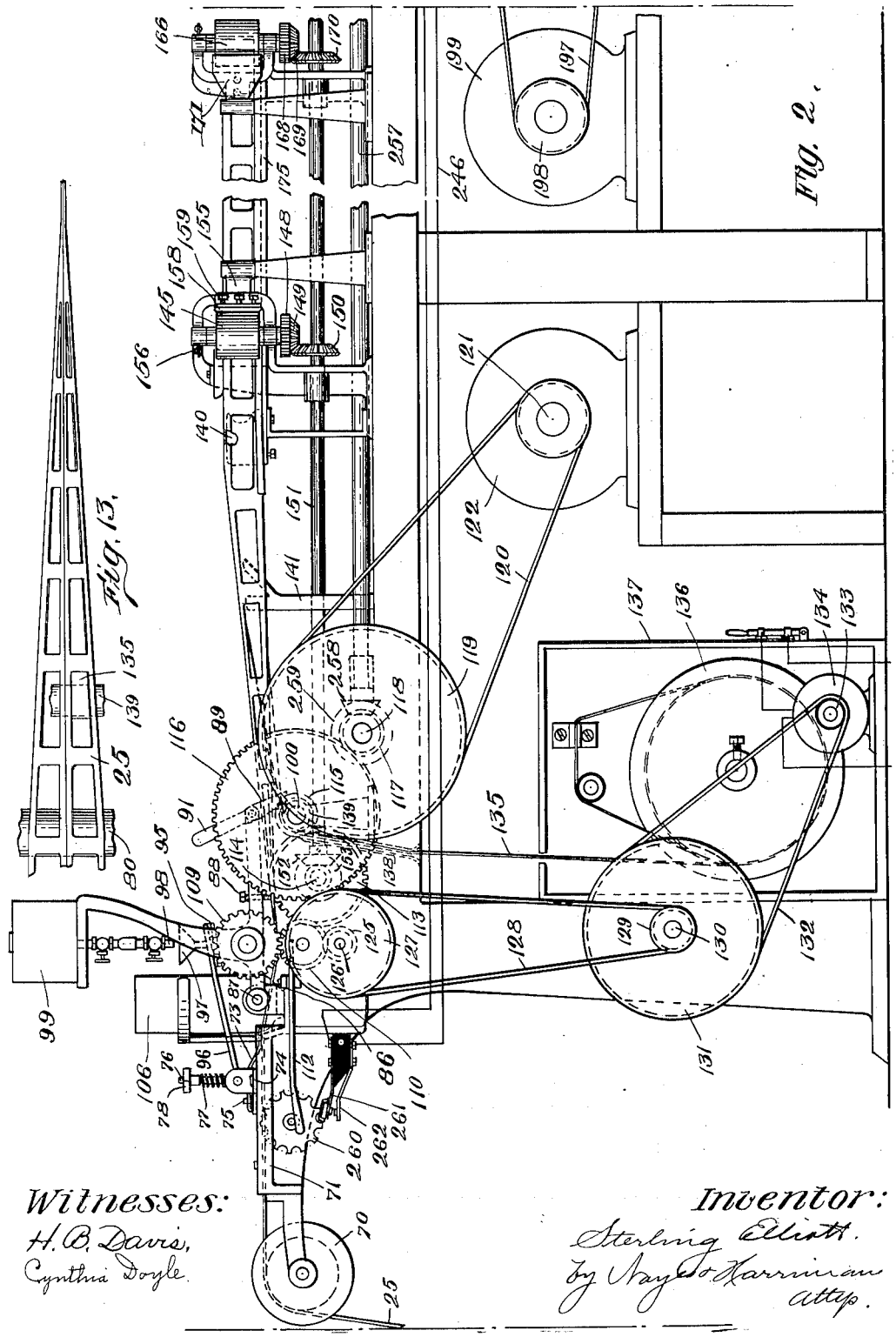
Figure 3:
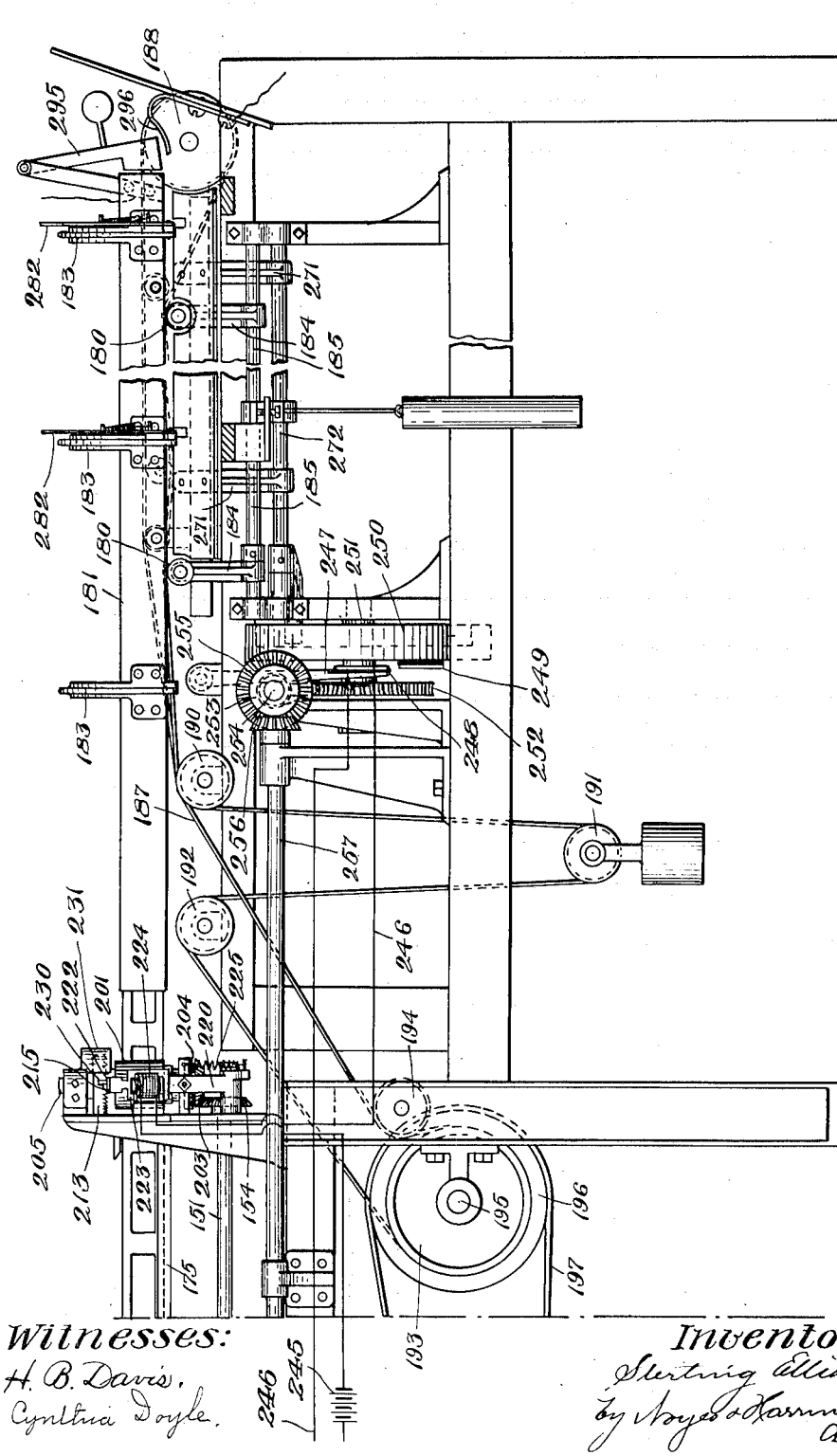

Figure 1 is a side elevation of the left-hand end portion of the machine embodying this invention. Fig. 2 is a like side elevation of the middle portion of the machine. Fig. 3 is a like side elevation of the right-hand end portion of the machine. Fig. 4 is an enlarged plan view of the feeding and cutting-mechanism for the frame-strip. Fig. 5 is an enlarged end view of the rolls constituting the feeding and cutting-mechanism for the frame-strip. Fig. 6 is a front elevation of the feeding and cutting rolls shown in Fig. 5. Fig. 7 is a transverse section of a pair of rolls employed to remove the pieces from the frame-strip which are cut by the cutting-roll. Fig. 8 is a front elevation of the rolls shown in Fig. 7. Fig. 9 is a plan view of a portion of the frame-strip. Fig. 10 is an enlarged longitudinal section of the gluing-mechanism taken on the dotted line 10—10, Fig. 11. Fig. 11 is a plan view of the gluing-mechanism shown in Fig. 10. Fig. 12 is a plan view of a cleaning-device for the upper-roll of the gluing-mechanism. Fig. 13 is a plan view of the frame-strip as it passes from the gluing-mechanism to the compressing-rolls, and is being folded over upon opposite sides of the blank-strip. Fig. 14 is a plan view of the compressing-rolls for adhesively securing the strips and guiding-means for directing the associated strips thereto. Fig. 15 is a front elevation of a pair of feeding-rolls for feeding forward the completed stencil-strip, any number of which may be employed. Fig. 16 is a front elevation of a cutting-device for the stencil-strip. Fig. 17 is an enlarged plan view of the same. Fig. 18 is an enlarged transverse section of the cutting-roll and its coöperating bed-roll. Fig. 19 is an enlarged vertical section of the cutting-roll. Figs. 20, 21 and 22 are enlarged sectional views of the means to assemble the severed portions in a row upon a table and hold them under pressure while they are drying. Fig. 23 is a plan view of a portion of the table and severed portions of the strip assembled thereon, and means to hold them under pressure. Fig. 24 is an enlarged detail view of the supporting means for the stencil-strip while it is being moved forward upon the table preparatory to being severed.

Referring particularly to the machine as here illustrated, the strip 25 of paper, such as tag stock or some similar kind of paper, and of the desired width to form the frame-strip, is drawn from a roll 26, Fig. 1, over a plane-surfaced idle-roll 27, and then between horizontally arranged upper and under guide-plates 28, 29, by a pair of positively driven rolls 30, 33, see Figs. 4 to 6, which rolls are also constructed to cut the strip, thereby to form holes therein while feeding it forward. 30 represents the under-roll of the pair. It has a plane cylindrical surface adapting it to serve as a bed-roll on which the strip of paper is cut, as well as a feed-roll. It is journaled at its ends in bearing-blocks 31, of any suitable construction which are supported by the frame-work. It is positively driven, and as here shown, has secured to one of its journals a small toothed gear 32 for this purpose. 33 represents the upper-roll of the pair. It is formed as a cylinder and has on its cylindrical surface sharp-edged ribs 34, arranged in quadrangular form to cut the strip of paper so that quadrangular shaped pieces may be removed to form holes therein, and as here shown four such quadrangularly arranged ribs are employed, which are arranged in two pairs, and designed to cut the strip to produce two pairs of holes during each rotation, the holes of each pair being side by side. It also has on its cylindrical surface a sharp edged rib 35, which is extended circumferentially entirely around it, designed to score the strip of paper between the holes of each pair. It also has on its cylindrical surface narrow, plane-edged ribs 36, 36, to engage the strip of paper for the purpose of holding it in engagement with the roll 30, and to feed it forward, said ribs being arranged at opposite sides of the rib 35. It is journaled at its ends in bearing-blocks 37, supported by the frame-work, and is positively driven, having secured to one of its journals a small toothed-gear 38, for this purpose, which is in mesh with the toothed gear 32.

The bed-roll 30 is made of hardened steel, and it is designed and intended that the cutting ribs 34 on the cutting-roll shall terminate close to but free from contact with the surface of said bed-roll, so that the strip of paper will be cut sufficiently to enable the quadrangularly shaped pieces to be subsequently removed by suitable means to be hereinafter described, but the rib 35 does not terminate quite as close to the surface of the bed-roll, as it is only employed to score the strip.

The cutting ribs 34, 34, scoring-rib 35, and plane-edged feeding-ribs 36, 36, are very carefully and accurately formed, and means are provided to adjust the roll 33, bearing them toward and from the bed-roll 30, to correctly position it with respect thereto.

Referring to Fig. 5 long screws 40, 40, extend through holes in the frame-work and through holes in the upper part of each bearing-block 37, and through screw-threaded holes in the lower part of each bearing-block 37, and their ends engage the tops of the bearing-blocks 31, so that the bearing-blocks 37, are connected with and adapted to be moved by the turning of the screws and the position of the upper-roll relative to the bed-roll thereby adjusted.

The strip 25, on leaving the cutting-rolls 30, 33, is fed forward to a pair of rolls, see Figs. 7 and 8, which are constructed and arranged to remove from it the severed or substantially severed quadrangular pieces.

As here shown 45 represents the upper-roll of the pair. It is formed as a cylinder and journaled at its ends in suitable bearings, but is driven by gears with its fellow roll when the strip of paper is arranged between them. It has ribs 46 arranged on and extended partially around its cylindrical surface, arranged in pairs, there being two pairs on one side of the cylinder, arranged side by side, and two pairs on the other side of the cylinder, arranged side by side. Each pair of ribs is made of a length and width corresponding to the length and width of the quadrangular pieces which are to be removed from the strip, and of the holes, to be thereby produced. Fingers 47 are arranged above the roll which engage tangentially the cylindrical surface of the roll at the sides of the ribs, and which act to prevent the strip from winding on the roll in case it should have a tendency to do so.

48 represents the under-roll of the pair. It is formed as a cylinder and is journaled at its ends in suitable bearings, and is positively driven, having secured to one of its journals a small toothed gear 49 for this purpose. It has several circumferential grooves, as 50, arranged opposite the ribs 46, to receive said ribs and thereby to enable them to extend below the meeting plane of the two rolls, so as to exert a downward pressure upon the portions of the strip to be removed, and to detach them from the strip. It has also circumferential grooves, as 51, at the bottoms of the grooves 50, arranged opposite the spaces between the ribs 46, which admit of the employment of fingers 52, arranged tangentially to its cylindrical surface, which prevent winding of the pieces on the roll in case they should have a tendency to do so. Its plane or ungrooved portions are in parallel with and adapted to coöperate with the portions of the roll 45, at the sides of the ribs 46, to engage and feed the strip forward. As the circumference of the ribbed portions of the upper-roll is greater than the circumferences of the grooved portions of the under-roll, it will be seen that as soon as the ribs 46 engage the quadrangular pieces which are to be removed from the strip and depress them with relation to the strip, as represented in Fig. 7, they will also act to advance the detached pieces at a greater rate of speed than the strip is being moved, so that the forward ends of said pieces will be projected beyond the corresponding ends of the holes, which is an advantage.

Individual driving-means is herein provided for this group of mechanism, which is adapted to be automatically started and stopped according to the amount of strip which is required, and herein an electro-motor 55 is employed as a driving-means, its shaft bearing a pinion 56, which engages a large toothed gear 57, secured to a shaft bearing a small toothed gear 58, which engages a large toothed gear 59, secured to one of the journals of the cutting-roll 33, thereby to rotate said roll and the toothed gear 38 on the other journal of said cutting roll being in mesh with the toothed gear 32, on the bed-roll operates to rotate said bed-roll; and said toothed gear 32 engages a large toothed gear 60, which in turn engages the small toothed gear 49, on the grooved under-roll 48, thereby to rotate said under-roll. As the motor-shaft is rotated the several rolls are rotated and the strip is continuously fed along and cut and the pieces detached from it. The detached pieces 62, represented by dotted lines Fig. 1, are permitted to fall by gravity down a suitable chute, while the perforated strip 25 is carried along over an idle-roll 63, thence under a gravitating take-up 64, and thence to the next group of mechanism. As a means to automatically start and stop this group of mechanism, the motor is controlled, and as here shown, the switch-arm 65 of any suitable electric-switch which controls the circuit of the motor is connected by a link 66, with a pivoted counterbalanced arm or frame 67, bearing the take-up roll 64, so that as the take-up roll is raised and lowered by the strip its arm or frame 67, will be moved on its pivot and the switch-arm operated. When more strip is being delivered than is required, the take-up roll falls by gravity and the switch-arm is moved to open the circuit of the motor, thereby to stop this group of mechanism, yet other portions of the machine may at such time continue to operate. As the take-up roll rises the switch-arm is moved in the opposite direction to close the circuit of the motor, thereby to start this group of mechanism.

The frame-strip 25 having holes formed in it, as represented in Fig. 9, is then delivered to the gluing-mechanism by which a suitable adhesive substance is applied to its under side, while it is being fed along, the operation being continuous. The adhesive substance which I prefer to employ is shellac, it being especially well suited to the purpose for the reason that it dries quickly, and is quite hard when dry, and acts to solidify and stiffen the paper of which the frame-strip is composed, which latter is a very important feature, as it gives to the completed stencil a quality and characteristic of vital importance. However, in lieu of shellac any other suitable substance may be employed, but for convenience in describing and referring to it I herein use the term glue.

Referring to Figs. 2 and 10 to 12, 70 represents an idle roll over which the frame-strip 25 passes from the take-up roll 64, and 71 a flat-surfaced, horizontally arranged table over which it passes, which serves as an under guide-plate, and 72 an upper guide-plate arranged horizontally above the table 71, with a space between it and the table for the passage of the frame-strip. 73 is a resilient finger, the forward free end portion of which bears yieldingly upon the frame-strip 25, and its rear end portion extends over a transversely arranged plate 74, which is supported at its ends upon upwardly extended side edges of the guide-plate 71, and the rear end portion of said finger 73 has perforations, one to receive a pin 75, rising from the plate 74, and another to receive a screw 76, rising from said plate 74, and a coiled spring 77, is arranged on said screw which is adapted to bear upon the finger, the pressure of which is adjusted by a nut 78, which is turned on the upper end portion of the screw 76. The parts thus described serve as guiding-means for the frame-strip at this part of the machine, and, it will be noted that as said strip is drawn through said guiding-means it will be held against transverse movement and also in a horizontal plane, but this particular form of guiding-means is not essential. From said guiding-means the frame-strip passes to a pair of rolls by which the glue is applied to its under side. 80 represents the glue-applying roll, which is journaled at its ends in the side walls above a glue-receptacle 81, and is constructed and arranged so that its lower part will enter the glue contained in said receptacle and its upper part will extend above the top of the receptacle. Said roll 80 is provided with a plane surface adapting it to carry upward from the glue-receptacle a continuous or unbroken film or layer of glue. A plate 82 is secured to the top wall of the glue-receptacle by thumb-screws 83, or otherwise, the forward edge of which plate extends lengthwise the glue-roll 80, substantially from end to end thereof, and terminates close to said roll to prevent an excessive amount of glue from being carried upward by the roll. 85 represents a roll which is arranged above the glue-roll 80, and which coöperates with said roll 80, to feed along the frame-strip while said roll 80 applies the glue. Said roll 85 is of peculiar construction especially adapting it for the work it is designed to perform. Referring particularly to Fig. 11, said roll 85 is represented as cylindrical, and is journaled at its ends in the side arms 86, of an open-frame structure, which is pivoted at 87, 87, to the frame-work. Said frame is provided with adjusting-screws 88, which engage a part of the frame-work, thereby to limit its downward movement, and hold the roll 85 in the desired relation to the roll 80. Means, adapted to be operated by hand are provided to lift and hold said structure in a slightly elevated position, and adapted to be operated automatically by a moving part of the machine to return it to its normal position. Said means, as here shown, consist of a prop 89, pivotally connected to an arm 90, extended from the open-frame structure, said prop having a hand-piece 91, for lifting it and moving it in one direction; and said prop is arranged adjacent to a rotatable shaft 100, and when lifted and swung by the hand-piece its lower end will engage said shaft at the top, and while said shaft is at rest will thus remain and hold the frame in elevated position, but as soon as said shaft begins to rotate in a clockwise manner, said prop will be moved by said shaft into the position shown in Fig. 10, and the open-frame bearing the roll 85 will fall by gravity, thereby resuming its normal position. The rolls 80 and 85 are supported relative to each other, so that the space between them is below the plane of the table 71, thereby to depress said frame-strip or deflect it, but when the frame bearing the roll 85 is raised, as for instance, when the prop is moved into engagement with the top of the shaft 100, said roll 85 will be raised sufficiently to admit of the frame-strip assuming a horizontal plane or thereabout, thereby to disengage it from the glue-roll, so that said glue-roll may rotate without applying glue to the frame-strip. Providing a pivoted or otherwise movable supporting-frame for the roll 85, enables this result to be accomplished which at times is very convenient.

The cylindrical surface of the roll 85, (see Fig. 11), is formed with two sets of circumferential grooves 92, which are disposed respectively opposite the holes in the frame-strip, and they are made as wide as the holes or thereabout, and the grooves are V-shaped, so as to form circumferential inverted V-shaped ribs on the roll. The end portions 93 of the roll, and also the portion 94 between the two grooved portions are formed with plane surfaces to engage the frame-strip. By providing the upper-roll 85 with grooved portions, as here shown, it will be apparent that glue carried upward by the glue-roll 80, will enter said grooves at the portions thereof opposite the holes in the frame-strip, and will not form an adhesive film on said roll as it would if said roll was formed with a plane surface, yet the ribbed portions of said roll 85 effectively hold the frame-strip in position to coöperate with the glue-roll 80, and are employed particularly for this purpose, otherwise they might be omitted entirely, leaving recesses in the roll.

In the operation of the machine some glue is usually applied to the edges of the V-shaped ribs and also to the edges of the plane-surfaced portions of the roll 85, and as it is quite necessary that said roll shall be kept as free from the glue as possible, means are herein provided for cleaning said roll in order that this result may be obtained. For this purpose a felt or other pad 95, (see Figs. 10 and 12,) is arranged above and in engagement with the roll 85, said pad being supported at the extremity of an open-frame 96, pivotally connected to ears on the transverse plate 74, or it may be otherwise supported. Said frame 96 also bears one or more funnels 97, which are arranged above the pad, and beneath a suitably controlled drip-pipe 98, leading from a receptacle 99, for containing alcohol, or other solvent for the glue. Hence the pad will be kept saturated with alcohol, and in order that it may effectively act to clean the roll 85 by continuous engagement therewith.

The glue-receptacle 81 is here shown as arranged on a removable block 105, or other support, which, when removed, permits the receptacle to descend in order that it may be withdrawn by an endwise movement from the machine. Said glue-receptacle 81 may have provision for a continuous supply of glue, and as here shown, a receptacle 106, such as a bottle containing glue may be supported in inverted position at one end of the receptacle 81 in any suitable manner, see Fig. 2.

The glue-roll 80 is rotated by two separate driving-means, one of which is adapted to be operatively connected therewith to operate the gluing-mechanism to apply glue to the frame-strip, and the other is adapted to be connected therewith when it is desired to rotate said glue-roll independently of the other parts of the gluing-mechanism, thus to permit said glue-roll to rotate while the frame-strip is disengaged from it and is not being moved forward. This provision is important when quick-drying glue is employed as it prevents the glue from setting on the glue-roll and adjacent parts and thereby clogging or impeding the operation of the machine. Said two separate driving-means are best shown in Figs. 2 and 11, and will now be described. A spur-gear 110, is splined on the shaft of the glue-roll 80, which is movable axially on said shaft, and a pivoted lever 112 having a bifurcated end to engage said gear is employed to move said gear axially. Said gear 110, when in one position, engages a spur-gear 109, secured to one of the journals of the upper-roll 85, to drive said roll, and also when in such position engages an intermediate spur-gear 113, secured to a shaft 114, which is engaged by a pinion 115, secured to the shaft 100, bearing a spur-gear 116, which is engaged by a pinion 117, secured to a shaft 118, bearing a belt-pulley 119, over which passes a belt 120, which passes over a belt-pulley 121, secured to the shaft of an electric-motor 122. When the motor is operating and the spur-gear 110, is in engagement with the spur-gears 109 and 113, the glue-roll and the upper-roll will be rotated to apply glue to the frame-strip and to feed said strip forward. Or, the spur-gear 110 may be moved axially on its shaft by a movement of the pivoted-lever 112, into its other position when it will disengage the spur-gears 109 and 113, and will engage a pinion 125, secured to a shaft 126, bearing a belt-pulley 127, over which passes a belt 128, which passes over a belt-pulley 129, secured to a shaft 130, to which is secured a belt-pulley 131, over which passes a belt 132, which passes over a belt-pulley 133, secured to the shaft of an electric-motor 134. When said motor 134 is operating the spur-gear 110 will be rotated and the glue-roll will be rotated independently of the upper-roll.

The frame-strip 25, having the glue applied to its under side, passes from the gluing-mechanism and as it is fed forward it is folded over the opposite sides of and pressed into firm engagement with the blank-strip, so that the two strips become adhesively secured together. The frame-strip passes from the glue-rolls, which are horizontally arranged, to a pair of rolls 145, 146, which are vertically arranged, see Figs. 2 and 14. It leaves the glue-rolls while in the same flat form that it was cut, and is folded gradually on the line of the score until its opposite side portions assume approximately a vertical position, and engage the opposite sides of the blank-strip. An upright post 141 is erected on the frame, between the gluing-mechanism and the rolls, 145, 146, over the top of which the frame-strip passes, said post being arranged approximately in a plane with the line of fold, and acts to keep the blank-strip from touching the glued surfaces. Also between said post and the feed-rolls 145, 146, a pair of guiding-members 142, 143, are located, which are supported horizontally on the machine-frame and so disposed as to receive the edges of the frame-strip while the side portions thereof are being drawn toward each other during the final part of the operation, hence they are located near the rolls 145, 146. Said guiding-members consist of flat bars having flanges at their extremities, and said bars converge in a direction toward the rolls 145, 146, and terminate at the rolls, as best shown in Fig. 14. Above said guiding-members a guiding-plate 144 is arranged beneath which the folded strip passes, which acts as a guide for the strip at the top.

135 represents the blank-strip which is taken from a roll 136 supported in a box-like compartment 137. This strip is usually solidified and stiffened and rendered waterproof by a previous treatment with shellac or other suitable material, but at this time is dry so that it can be conveniently manipulated. It is drawn from the roll 136, in an upward direction through a flattened tube 138, or other guide arranged on the frame opposite one side portion or half of the frame-strip 25, (see Figs. 10 and 11,) and thence over a roll 139, which is arranged on the shaft 100, so that the blank-strip is deflected by said roll 139 into substantially a horizontal plane. At such point it occupies a position just beneath one side portion or half of the frame-strip. It then passes through a vertically disposed tube 140, supported on the frame and thence to and between the aforesaid vertically disposed rolls 145, 146, with the frame-strip, hence is deflected from a horizontal to a vertical plane, following a corresponding deflection of the frame-strip and remaining beneath one side portion thereof and at one side of the post 141. The guide-tube 140 is arranged between the converging guiding-members 142, 143, for the frame-strip, and as the blank-strip emerges from said guide-tube it is engaged at its opposite sides by the side portions of the frame-strip and the two strips are adhesively secured together. In this relative position they pass between the rolls 145, 146. The rolls 145, 146, are positively driven and, as here shown, the roll 146 has secured to one of its journals a spur-gear 147, which is engaged by a spur-gear 148, secured to the journal of the roll 145, and a bevel-gear 149, is arranged on said spur-gear 148, which is engaged by a bevel-gear 150 secured to a horizontal shaft 151, which extends lengthwise the machine, and at one end has secured to it a bevel-gear 152, which engages a bevel-gear 153, secured to the shaft 114. The roll 146 is supported in fixed bearings on the frame, but the roll 145 is supported in a bracket 155, pivotally supported on a post erected on the frame and is thus movable toward and from the roll 146, and a spring 156 is connected at one end to the support for the fixed roll, and at the other end to the bracket, which acts to hold the roll 145 yieldingly in engagement with the roll 146, thus to yieldingly compress the strips which pass between them as well as operating to feed said strips forward. A resilient plate 158 is arranged at the side of the feed-roll 145, and attached at one end to a support 159, its free end bearing upon the surface of said roll 145, and acting to remove from said roll any glue which may be deposited thereon. Said plate 158 is arranged tangentially to and is held in contact with the roll, and its pressure thereon is adjusted by an adjusting-screw 160. The completed stencil-strip then passes from the compressing-rolls 145, 146, to one or more pairs of feeding-rolls, by which it is fed forward in vertical position, one of such pairs of feeding-rolls only being shown for illustration, (see Figs. 2 and 15), wherein 165, 166, respectively represent said feeding-rolls. They are arranged in vertical position, and are positively rotated, and one of them is yieldingly supported whereby it is movable with respect to the other, thereby to engage the stencil-strip with a yielding pressure. The roll 165 is here shown as supported on a bracket fixed to the frame, and has secured to one of its journals a spur-gear 167, which engages a spur-gear 168, on one of the journals of the roll 166, and said roll 165 also has secured to one of its journals a bevel-gear 169, which engages a bevel-gear 170, secured to the shaft 151. The roll 166 is supported on a swinging bracket 171, mounted on an upright post on the frame, and said roll is drawn toward its fellow roll by springs 172, 172, which are arranged above and below the rolls, and attached at one end to the bracket and at the other end to the fixed support for the roll 165.

As the stencil-strip passes from one to another pair of feeding-rolls means are provided to prevent it from sagging, and, as shown in Figs. 2 and 14, a stationarily supported bar 175, is arranged horizontally beneath the stencil-strip and extended from one pair of rolls to another, and has a groove in its upper side to receive the lower edge of the stencil-strip, thus guiding as well as supporting said strip.

The completed stencil-strip is fed forward a predetermined distance over a table, usually in a straight line, and is severed, and the severed portion of the strip is deposited upon the table and supported in vertical position or edgewise; then this operation is repeated and another severed portion deposited upon the table, in vertical position, at the side of the aforesaid severed portion, and during each operation the severed portions which are assembled on the table are pushed along bodily, a distance equal to at least the thickness of the strip, to provide a space for the next severed portion, and the assembled, contiguously disposed severed portions are held under sufficient pressure to keep them straight and flat while they are drying. They are subsequently removed from the table and the stencils cut from them. The portion of the apparatus by which these results are attained will now be described, reference being had to Figs. 3 and 16 to 24. The stencil-strip is fed forward by the feeding-rolls 165 and 166, while resting on the edge-guide 175, to a rotary cutting-device and then between a pair of side plates 181, 182, and over a set of positively driven rolls arranged beneath the space between said side plates until the end of the strip arrives at or near the end of the table. The strip is supported by the rolls and held against lateral deflection by the side plates. Said side plates are arranged in parallel relation and supported by brackets 183 secured to the table. The supporting-rolls 180 are arranged on short horizontal shafts having their bearings at the upper ends of upright arms 184, which are connected by a bar 300, and are secured to a shaft 185 which is adapted to be rocked in one direction to move all of the arms and rolls borne by them from a position beneath the space between the side bars, as shown in Fig. 20, to a position at one side of said space, as shown in Fig 21, thereby to form an unobstructed space to admit of the strip falling by gravity upon the table. Said rolls are positively driven, so that they act to assist in feeding forward the strip as well as to support it, and for the purpose of rotating all of said rolls in the same direction the shafts bearing them have secured to them belt-pulleys 186 over which a belt 187 passes, and said belt also passes around a belt-pulley 188 at the extreme end of the table, and also over belt-pulleys 189 supported on one of the side plates 182, and also over belt-pulleys 190, 191, 192, 193, 194. The belt-pulley 193 serves as the driving-pulley and it is secured to a shaft 195, bearing a belt-pulley 196, over which a belt 197, passes, which also passes over a belt-pulley 198, secured to the shaft of an electric-motor 199. However, other means may be employed for rotating the shaft bearing said rolls 180. When the stencil-strip has been fed forward until its end arrives at approximately the extreme end of the table it is severed. The severing of the strip is automatically controlled, so that the severed portions will be of the same length, and the lines of severance will be produced at the middle of one of the imperforate portions of the strip, or other predetermined point.

The cutting-device is illustrated in Figs. 3 and 16 to 19, and comprises a bed-roll 200 and a cutting-roll 201. The bed-roll 200 is made cylindrical, with a plane face, and is secured to a vertical shaft mounted in bearings in a bracket on the frame, and said shaft has a spur-gear 202 secured to it and also a bevel-gear 203, and the latter engages a bevel-gear 154 secured to the rotating-shaft 151, so that said bed-roll is rotated positively and continuously. Its spur-gear 202 engages a spur-gear 204, (see Figs. 16 and 19), secured to a vertical shaft 205 mounted in bearings in the bracket on the frame, thereby to rotate said shaft continuously. The cutting-roll 201 is mounted loosely on said vertical shaft 205, and, as here shown, consists of a cylinder having a recess in its side, extended from end to end of it, or thereabout, in which a support 206 for a cutting-blade 207 is placed, which may be of any suitable construction, but preferably so made that the cutting-blade is adjusted radially to the axis of the cylinder. Said blade-support 206 may be formed with an extension 208 at its upper end, having an ear 209, which extends over and rests by gravity upon the head of an adjusting-screw 210, so that the turning of said screw causes or admits of vertical movement of the blade-support up and down; and said blade-support is formed with an inclined back-portion 212 which engages a correspondingly inclined seat at the bottom of the recess in the cylinder, so that as the blade-support is moved vertically the blade will be moved radially to the axis of the cylinder. Said cylinder is normally at rest, and is also held in a predetermined position, and when rotated is caused to make one complete cycle and then come to rest, and during said cycle its cutting-blade cuts the stencil-strip. For the accomplishment of these results means are provided for connecting the cylinder with the shaft 205 bearing it at the desired moment, whereby it is rotated by said shaft, and for subsequently disconnecting it therefrom at the end of a cycle of its operation. As here shown, a ratchet-toothed wheel 213 is secured to the shaft 205, which is arranged above or at one end of the cylinder, and said ratchet-toothed wheel is adapted to be engaged by a detent 214, rising from a detent-carrying arm 215, pivotally supported to ears 216, arranged at the top or end of the cylinder, thus admitting of movement of the detent into and out of engagement with the ratchet-wheel. The detent-carrying arm is moved upward by a spring 217, to cause its detent to engage the ratchet-wheel, but is normally held down against the pressure of its lifting spring, and with its detent out of engagement with the ratchet-wheel, by a locking-device. The locking-device is here shown as an arm 220, pivoted at 221, and bearing at its upper end a plate 222, with a notch to receive the end of the detent-carrying arm, and also bearing the armature 223 of an electro-magnet 224. Said magnet is normally deënergized and its armature and the lever bearing it are held in retracted position by a spring 225, with its notched plate in engagement with the detent-carrying arm. When said magnet is energized and its armature attracted the detent-carrying arm will be disengaged, and the latter will be lifted and caused to engage the ratchet-wheel. Connection with the rotating ratchet-wheel having thus been made the cylinder is revolved by the ratchet-wheel until a pin 230, on the detent-carrying arm passes beneath the cam 231, which latter acts to depress the detent-carrying arm and cause its detent to disengage the ratchet-wheel. As it is necessary to move the detent-carrying arm a short distance about the axis of the cylinder after its detent has disengaged the ratchet-wheel and until its pin has disengaged the cam a friction-device may be employed for this purpose, which, as here shown, consists of a friction-wheel 235, arranged on the shaft, and within a recess in the end of the cylinder, said wheel engaging the shaft and also the cylinder frictionally, so that as the shaft continues to rotate said friction-wheel will be turned and the cylinder turned by it for the short distance required for disengagement of the pin from the cam.

As the bed-roll 200 is rotated continuously and the cutting-roll is rotated only when connected with its continuously rotating shaft, means are provided to admit of movement of the stencil-strip freely between said rolls when not engaged by them, and as here shown the cutting-roll is slabbed off on one side, as at 240, (see Fig. 18), and when said cutting-roll is at rest the flat portion thus formed is arranged to normally occupy a position opposite the bed-roll, being at the side of the stencil-strip.

For the purpose of automatically connecting the cutting-roll with its shaft at the proper time, the electro-magnet 224 is energized by a current from a battery 245, see Fig. 3, arranged in a circuit 246, which includes two circuit-controllers for closing said circuit. One of said circuit-controllers consists of an arm 247 bearing a pair of contact-plates 248 arranged for engagement with a contact-plate 249 on the side of a cam-disk 250. Said cam-disk is positively and continuously rotated, and, as here shown, it is secured to a short shaft 251, bearing a worm-wheel 252, which engages a worm 253, secured to a shaft 254, bearing a bevel-gear 255, which engages a bevel-gear 256, secured to a shaft 257, extended horizontally lengthwise the machine, and bearing a bevel-gear 258, which engages a bevel-gear 259, secured to the positively driven shaft 118. Said cam-disk is designed to make one rotation while a predetermined length of strip is being fed forward, and its contact-plate 249 engages the contact-plates 248 at the moment such predetermined length of strip has been fed forward. The other circuit-controller consists of a spur-wheel 260, see Figs. 2 and 10, arranged beneath the stencil-strip on table 71 with one edge crossing the path of movement of said strip, so that the perforated portions will engage the spurs of said wheel for the purpose of rotating it step by step as the strip is moved forward, and a pair of resilient contact-members 261, 262, are arranged adjacent said spur-wheel, to which contact-members circuit-wires are connected, said contact-members being normally separated but adapted to be repeatedly closed by the engagement therewith of the spurs of said spur-wheel. By means of this second circuit-controller the location of the line of severance is controlled. The electro-magnet 224 will be energized only when both circuit-controllers are closed.

The stencil-strip having been fed forward a predetermined distance and severed, the severed portion is then deposited upon the table, in juxtaposition to other severed portions of the strip, as represented in Figs. 20 to 24. The assembled severed portions are held under pressure, so that they will remain flat and straight while they are drying.

Referring to Figs. 20 to 23, 265 represents a large number of severed portions of the strip assembled on the table in a row. The forward end of the row bears against a sectional or other bar 266, the sections of which are hinged together to give to the bar a certain degree of flexibility, and said sectional bar bears against a plurality of weighted blocks 267, and said bar and the weighted blocks are slidably mounted on the table to admit of being moved along by pressure upon them as the severed portions are moved along when new severed portions are added to the opposite or rear end of the row. The assembled severed portions are held in upright position and are pressed against the sliding-bar and the blocks or equivalent sliding-means which may be employed in lieu thereof, by a presser-bar 270, which engages the rear end of the row. Said presser-bar is extended lengthwise the severed-portions, and is supported by several arms 271, secured to a rock-shaft 272. Movement of said shaft permits said bar to move toward and from the rear end of the row of severed portions. Said bar is arranged adjacent the supporting-rolls 180 and is cut away at places opposite said rolls 180, to receive said rolls or portions of them, and is also cut away to form recesses for pivoted latches 280, which latter are employed to hold the severed portions assembled while the presser-bar is removed therefrom. The presser-bar is moved backward for the purpose of enabling the next severed portion to fall in front of it, and is returned to move said severed portion into engagement with the rear end of the row, thus adding a new severed portion thereto. The shaft 272 is rocked to move the presser-bar away from the row, just in advance of a similar movement being imparted to the shaft 185 for the purpose of moving the supporting-rolls 180 away from the space between the side plates 181, 182, so that both the presser-bar and the rolls will be moved, the former in advance of the latter, to present an unobstructed space to permit a severed portion of the strip to fall by gravity upon the table, and then said rolls and presser-bar are returned. As a means to rock said shafts 185 and 272 the cam-disk 250 is employed, which is engaged by an arm 285, secured to the rock-shaft 272, and during each rotation of said disk said shaft is rocked, and an arm 286 is secured to said shaft having an adjusting-screw 287, which occupies a position beneath the arm 288, secured to the rock-shaft 185, so that when the shaft 272 is rocked said screw will engage the arm 288, and rock the shaft 185 in one direction to remove the rolls 180 from beneath the severed portion of the strip which rests upon it, and suitable weights 290 are connected to said arm 288 for the purpose of moving said rock-shaft in the opposite direction until the arm engages the limiting-stop 291. In lieu of this means of rocking said shafts other means may be employed, but it is quite important that the presser-bar shall be moved in advance of the rolls, otherwise the severed-portion of the strip resting on the rolls will fall upon said bar. The pivoted latches 280 engage the rear end of the row of assembled severed portions and hold them in upright position while the presser-bar is out of engagement therewith, see Figs. 20 to 22, and are lifted by the severed portions which are added to the row, and which are thrust beneath them by the presser-bar.

The latches are held in engaging position by the springs 281. As here shown, said latch has connected to it a semaphore signal 282 by which its position may be indicated.

If desired, an electric signaling-device may be arranged at the end of the table adapted to be engaged by the end of the stencil-strip for the purpose of ringing a bell, and, as here shown, a circuit-controlling member 295 is arranged at the rear end of the table to be engaged by the stencil-strip and moved into engagement with a coöperating circuit-closing member 296 to close an electric-circuit containing the signaling-device, not shown.

The means here shown for forming the frame-strip forms the subject-matter of a divisional application No. 768,450, filed May 19, 1913.

I claim:—

1. In a machine for making stencil-strips composed of a blank-strip and a frame-strip, the combination of means to feed forward a strip of paper and cut holes therein, said holes being arranged in pairs, side by side, and means to score said strip longitudinally between the holes of each pair, thereby to form a frame-strip, means to apply glue to one side of said frame-strip, blank-strip supporting-means, means to feed forward the frame-strip and blank-strip, associated together, and to fold the frame-strip over upon opposite sides of the blank-strip, thereby to adhesively secure said strips together, substantially as described.

2. In a machine for making stencil-strips composed of a blank-strip and a frame-strip, the combination of means to feed forward a strip of paper and cut holes therein, said holes being arranged in pairs, side by side, and means to score said strip longitudinally between the holes of each pair, thereby to form a frame-strip, driving-mechanism for said strip-forming-means, means to feed forward said frame-strip and to apply glue to one side of it, a take-up roll for the frame-strip arranged between the strip-forming mechanism and gluing-mechanism, and means controlled by said take-up roll to start and stop the driving-mechanism for the strip-forming-means, blank-strip supporting-means, means to feed forward the frame-strip and blank-strip, associated together, and to fold the frame-strip upon opposite sides of the blank-strip, thereby to adhesively secure said strips together, substantially as described.

3. In an apparatus for making stencil-strips composed of a blank-strip and a frame-strip, the combination of means to form a perforated frame-strip, a glue-roll to apply glue to the under side of said strip, a roll coöperating with said glue-roll having narrow strip-engaging portions with spaces therebetween arranged opposite the perforated portions of the strip and plane-faced portions arranged opposite those portions of the strip at the sides of the perforated portions, and means to rotate said rolls, substantially as described.

4. In an apparatus for making stencil-strips composed of a blank-strip and a frame-strip, the combination of means to form a perforated frame-strip, a glue-roll to apply glue to the under side of said strip, a roll coöperating with said glue-roll having on its surface several V-shaped ribs arranged opposite the perforated portions of the strip to form strip-engaging portions with spaces therebetween, and means to rotate said rolls, substantially as described.

5. In an apparatus for making stencil-strips composed of a blank-strip and a frame-strip, the combination of means to form a perforated frame-strip, a glue-roll to apply glue to the under side of said strip, a roll coöperating with said glue-roll having several strip-engaging portions with spaces therebetween arranged in two sets opposite the perforated portions of the strip, and means to rotate said rolls, substantially as described.

6. In an apparatus for making stencil-strips composed of a blank-strip and a frame-strip, the combination of means to form a perforated frame-strip, a glue-roll to apply glue to the under side of said strip, a roll coöperating with said glue-roll having grooved portions arranged opposite the perforated portions of the strip, and plane-faced portions arranged opposite the middle and side portions of the strip, and means to rotate said rolls, substantially as described.

7. In an apparatus for making stencil-strips composed of a blank-strip and a frame-strip, the combination of means to form a perforated frame-strip, a glue-roll to apply glue to the under side of said strip, a roll arranged above said glue-roll to engage the upper side of the strip, a cleaning-pad engaging said roll to clean it, and means to saturate said pad with a liquid-solvent for the glue, substantially as described.

8. In an apparatus for making stencil-strips composed of a blank-strip and a frame-strip, the combination of means to form a perforated frame-strip, a glue-roll to apply glue to the under side of said strip, a roll arranged above said glue roll to engage the upper side of the strip, means to rotate said rolls, and means to rotate the glue-roll independently of its coöperating roll, substantially as described.

9. In an apparatus for making stencil-strips composed of a blank-strip and a frame-strip, the combination of means to form a perforated frame-strip, a glue-roll to apply glue to the under side of said strip, a roll arranged above said glue-roll to engage the upper side of the strip, two separate driving-mechanisms, means to connect the glue-roll with either driving-mechanism and to connect the coöperating roll with one of the driving-mechanisms only, substantially as described.

10. In an apparatus for making stencil-strips composed of a blank-strip and a frame-strip, the combination of means to form a perforated frame-strip, a glue-roll to apply glue to the under side of said strip, a roll arranged above said glue-roll to engage the upper side of the strip, and a movable support for said coöperating roll whereby said roll is movable into and out of coöperative relation with the glue-roll, substantially as described.

11. In an apparatus for making stencil-strips composed of a blank-strip and a frame-strip, the combination of means to form a perforated frame-strip, a glue-roll to apply glue to the under side of said strip, a roll arranged above said glue-roll to engage the upper side of the strip, a movable support for said coöperating roll, means to hold said support with the coöperating roll removed from the glue-roll, said means adapted to be operated by a movable part of the machine to move said roll into coöperative relation with the glue-roll, substantially as described.

12. In an apparatus for making stencil-strips composed of a blank-strip and a frame-strip, the combination of means to form a perforated frame-strip, a glue-roll to apply glue to the under side of said strip, and means to support said strip in a plane above the top of the glue-roll, a roll arranged above said glue-roll to engage the upper side of the strip, and a movable support for said roll, whereby said roll is movable toward and from the glue-roll thereby to deflect the strip and cause it to engage the glue-roll and admit of its disengagement from said glue-roll, substantially as described.

13. In an apparatus for making stencil-strips composed of a blank-strip and a frame-strip, the combination of means to form a perforated frame-strip, means to apply glue to one side of said strip, means to feed forward said strip with a blank-strip associated therewith, and to fold said frame-strip over upon the opposite sides of said blank-strip and adhesively secure it thereto, substantially as described.

14. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips, and to fold the frame-strip over upon the opposite sides of the blank-strip and adhesively secure it thereto, substantially as described.

15. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, means to feed forward said strips and fold the frame-strip upon the opposite sides of the blank-strip and adhesively secure it thereto, substantially as described.

16. In an apparatus for making stencil-strips composed of a blank-strip and a frame-strip, the combination of means to form a perforated frame-strip, means to apply glue to the under side of said strip, means to present a blank-strip beneath one side portion of the glue-coated frame-strip, in parallel relation therewith, means to feed forward said associated strips and fold the frame-strip upon the opposite sides of the blank-strip and adhesively secure it thereto, substantially as described.

17. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, means to feed forward said strips and fold the frame-strip upon the opposite sides of the blank-strip and adhesively secure it thereto, and means to guide the frame-strip and direct its folding operation, substantially as described.

18. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip in parallel relation therewith, a pair of vertically disposed rolls to feed said strips forward and cause the frame-strip to fold upon opposite sides of the blank-strip and to be adhesively secured thereto, substantially as described.

19. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, and an upright post over the top of which said strip is passed, substantially as described.

20. In an apparatus for making stencil-strips composed of a blank-strip and a frame strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, one of said vertical rolls being yieldingly supported, substantially as described.

21. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, and guiding-means to direct the strips to said vertical rolls, substantially as described.

22. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, and converging guiding-means to direct the frame strip to said vertical rolls, substantially as described.

23. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, converging guiding-means to direct the frame-strip to said vertical rolls, and an edge-guide arranged in the plane of said guiding-means for the blank-strip, substantially as described.

24. In an apparatus for making stencil-strips composed of a blank-strip and a frame-strip, the combination of means to form a perforated frame-strip, means to apply glue to one side of said strip, means to present a blank-strip opposite one side portion of the glue-coated frame-strip, in parallel relation therewith, a pair of vertically disposed rolls to feed said strips forward and cause the frame-strip to fold upon opposite sides of the blank-strip and to be adhesively secured thereto, converging guiding-means arranged beneath the strips and edge-guides, arranged respectively above and below the strips to direct said strips to the vertical rolls, substantially as described.

25. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, and means to sever said strip when a predetermined length has been fed forward, substantially as described.

26. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, a table, means to feed forward the completed stencil-strip lengthwise the table, means to support said strip above the table while it is being fed forward, said supporting-means being movable to admit of the severed portion of the strip falling upon the table, and means to sever the strip when a predetermined length has been fed forward, substantially as described.

27. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip and sever it, a table, and means to contiguously dispose the severed portions of the strip upon the table and hold them while they are drying, substantially as described.

28. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, and means to successively deposit the severed portions of the strip upon the table and assemble them in a row, substantially as described.

29. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, a table, means to feed forward the completed stencil-strip a predetermined distance and sever it, a pair of side plates between which the strip is fed, positively-driven supporting-rolls arranged beneath said side plates which support the strip and assist in feeding it forward, and supports for said rolls which are movable to move the rolls from beneath the strip, whereby the strip is permitted to fall upon the table, substantially as described.

30. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, a cutting-blade to sever the strip, and automatic means to operate said cutting-blade when a predetermined length of strip has been fed forward, substantially as described.

31. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward a completed stencil-strip, a blade to sever the strip, and automatic means to operate said blade when a predetermined length of strip has been fed forward, said automatic-means having controlling-means by which the blade is caused to sever the strip at a predetermined point, substantially as described.

32. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, and means to sever the strip when a predetermined length has been fed forward comprising a rotatable bed-roll and a coöperating rotatable blade-carrying roll, substantially as described.

33. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, and means to sever the strip when a predetermined length has been fed forward comprising a rotatable bed-roll and a coöperating rotatable blade-carrying roll, and means to connect said blade-carrying roll with the power-driven mechanism and to disconnect it therefrom, substantially as described.

34. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, a rotating bed-roll and a coöperating cutting-roll between which the strip passes, automatic-means to operatively connect said cutting-roll with the power-driven mechanism when a predetermined length of the strip has been fed forward and to disconnect it therefrom, substantially as described.

35. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, a rotating bed-roll and a coöperating cutting-roll between which the strip passes, automatic-means to operatively connect said cutting-roll with the power-driven mechanism when a predetermined length of strip has been fed forward and to disconnect it therefrom, having controlling-means to affect such connection at a predetermined time with respect to the movement of the strip, substantially as described.

36. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip over upon opposite sides of the blank-strip and adhesively secure them together, means to feed forward the completed stencil-strip, a rotating bed-roll, a coöperating roll bearing a radially adjustable cutting-blade between which said strip passes, and means to rotate said blade-carrying roll, substantially as described.

37. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, and means to successively deposit the severed portions of the strip upon the table and assemble them in a row and apply pressure thereto, substantially as described.

38. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, means to support the strip while it is being fed forward which is movable to admit of the strip falling upon the table, a pressure-bar bearing against the row of severed portions on the table, and means to move said presser-bar to admit a new severed portion at the rear end of the row, substantially as described.

39. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, means to support the strip while it is being fed forward which is movable to admit of the strip falling upon the table, a pressure-bar bearing against the row of severed portions on the table, means to move said pressure-bar to admit a new severed portion at the rear end of the row, and a latch to engage the rear end of the row and hold the severed portions assembled when the pressure-bar is disengaged therefrom, substantially as described.

40. In an apparatus for making stencil-strips composed of a blank-strip and a frame-strip, the combination of means to form a perforated frame-strip, means to apply the glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, means to support the strip while it is being fed forward which is movable to admit of the strip falling upon the table, a pressure-bar bearing against the row of severed portions on the table, and means to move said pressure-bar to admit a new severed portion at the rear end of the row, and a latch to engage the rear end of the row and hold the severed portions assembled when the pressure-bar is disengaged therefrom, and an indicating-signal operated by said latch whereby its position may be indicated, substantially as described.

41. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, movable supporting-means to support the strip while it is being fed forward, a pressure-bar bearing against the rear end of the row of assembled strips on the table, means to move said pressure-bar to admit a newly severed portion, and means to move the supporting-means for the newly severed portion to admit of the strip falling upon the table in position to be moved into engagement with the rear end of the row, substantially as described.

42. In an apparatus for making stencil-strips composed of a blank-strip and a frame-strip, the combination of means to form a perforated frame-strip, means to apply glue to one side of said strip, means to present a blank-strip to the glue-coated side of said frame-strip, means to feed forward the associated strips and fold the frame-strip upon opposite sides of the blank-strip and adhesively secure them together, means to feed forward the completed stencil-strip a predetermined distance and sever it, a table to receive the severed portions of the strip, movable supporting-means to support the strip while it is being fed forward, a pressure-bar bearing against the rear end of the row of assembled strips on the table, means to move said pressure-bar to admit a newly severed portion, and means to move the supporting-means for the newly severed portions to admit of their falling upon the table in position to be moved into engagement with the rear end of the row, said pressure-bar being moved in advance of the supporting-means, substantially as described.

In testimony whereof, I have signed my name to this specification, in the presence of two subscribing witnesses.

STERLING ELLIOTT.

Witnesses:
 B. J. NOYES,
 H. B. DAVIS.